(12) United States Patent
Suresh

(10) Patent No.: US 9,118,477 B2
(45) Date of Patent: Aug. 25, 2015

(54) METHOD AND SYSTEM FOR EFFICIENT ERROR FREE PACKET RECEPTION USING HYBRID AUTOMATIC REPEAT-REQUEST (HARQ) IN A WIRELESS COMMUNICATION SYSTEM

(71) Applicant: TEJAS NETWORKS LIMITED, Bangalore, Karnataka (IN)

(72) Inventor: Sriram N. Suresh, Tamilnadu (IN)

(73) Assignee: Tejas Networks Limited (IN)

( * ) Notice: Subject to any disclaimer, the term of this patent is extended or adjusted under 35 U.S.C. 154(b) by 18 days.

(21) Appl. No.: 13/853,918

(22) Filed: Mar. 29, 2013

(65) Prior Publication Data

US 2013/0339813 A1    Dec. 19, 2013

(30) Foreign Application Priority Data

Mar. 31, 2012   (IN) .......................... 1296/CHE/2012

(51) Int. Cl.
*H04L 1/18*  (2006.01)
*H04L 1/00*  (2006.01)

(52) U.S. Cl.
CPC ............ *H04L 1/1812* (2013.01); *H04L 1/0002* (2013.01); *H04L 1/1819* (2013.01); *H04L 1/1845* (2013.01)

(58) Field of Classification Search
CPC .................................................... H04L 1/1812
USPC ................................................. 714/751, 780
See application file for complete search history.

(56) References Cited

U.S. PATENT DOCUMENTS

| | | | | |
|---|---|---|---|---|
| 7,280,606 B2 * | 10/2007 | Kim et al. | ...................... | 375/295 |
| 7,376,195 B2 * | 5/2008 | Jonsson et al. | ................ | 375/262 |
| 7,400,607 B2 * | 7/2008 | Kim et al. | ...................... | 370/335 |
| 7,912,150 B2 * | 3/2011 | Kim et al. | ...................... | 375/316 |
| 8,327,234 B2 * | 12/2012 | Earnshaw et al. | ............. | 714/780 |
| 8,516,353 B2 * | 8/2013 | Lee et al. | ....................... | 714/794 |
| 8,638,730 B2 * | 1/2014 | Oh et al. | ....................... | 370/329 |
| 8,750,418 B2 * | 6/2014 | Lee et al. | ...................... | 375/299 |

\* cited by examiner

*Primary Examiner* — Esaw Abraham
(74) *Attorney, Agent, or Firm* — Merchant & Gould P.C.

(57) ABSTRACT

The present invention relates to a method and system for efficient error free packet reception using hybrid automatic repeat-request (HARQ) in a wireless communication system. In one embodiment this is accomplished by receiving in a plurality of modulated digital data as transmission signal at a receiver transmitted through a plurality of transmission paths from a transmitter, demodulating the received transmission signals, estimating the difference between the received transmission signals and the ideal expected signal constellation in order to determine the weights for each constellation symbols, applying the determined weights for each symbol-wise of the received transmission data, storing the weighted data as final data in a buffer of a HARQ combining unit and processing the stored final data to determine whether the received data frames are correct.

8 Claims, 4 Drawing Sheets

METHOD AND SYSTEM FOR EFFICIENT ERROR FREE PACKET RECEPTION USING HYBRID AUTOMATIC REPEAT-REQUEST (HARQ) IN A WIRELESS COMMUNICATION SYSTEM

This application claims benefit of Serial No. 1296/CHE/2012, filed 31 Mar. 2012 in India and which application is incorporated herein by reference. To the extent appropriate, a claim of priority is made to the above disclosed application.

FIELD OF THE INVENTION

The present invention generally relates to data communication and, more particularly, to a method and system for reducing the number of re-transmission & improving the system throughput using weighted hybrid automatic repeat-request (HARQ).

BACKGROUND OF THE INVENTION

To improve the reliability of data transmission, some wireless systems employ a hybrid automatic repeat-request (HARQ) scheme where error detection (ED) bits and forward error correction (FEC) bits are added to transmissions. A receiver can use these ED and FEC bits to determine whether or not a packet was decoded properly. If not, the receiver may signal the transmitter via a negative acknowledgment (NAK), prompting the transmitter to retransmit the packet.

In some applications, Chase combining may be employed, where incorrectly received coded data blocks are stored at the receiver (in a HARQ buffer) rather than discarded. When the retransmitted block is received, the retransmitted block is combined with the previously received block, which can increase the probability of successful decoding. Different types of combining techniques may have an impact on bit error rate performance and the required buffer size, depending on transmission parameters.

Unfortunately, transmission parameters often change, especially between wireless channels, such that the type of combining scheme implemented in a receiver is not always optimal.

Thus there is a need for a method and system for efficient error correcting using hybrid automatic repeat-request (HARQ).

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one aspect of the present invention is a method for efficient error free packet reception using hybrid automatic repeat-request (HARQ) in a wireless communication system, the method comprising: receiving in a plurality of modulated digital data as transmission signal at a receiver transmitted through a plurality of transmission paths from a transmitter, demodulating the received transmission signals, estimating the difference between the received transmission signals and the ideal expected signal constellation in order to determine the weights for each constellation symbols, applying the determined weights for each symbolwise of the received transmission data, storing the weighted data as final data in a buffer of a HARQ combining unit and processing the stored final data to determine whether the received data frames are correct.

In accordance with another aspect of the present invention is an enode B, comprising: a receiver for receiving in a plurality of modulated digital data as transmission signal transmitted through a plurality of transmission paths from a transmitter, an OFDM demodulator unit for demodulating the received transmission signals, an evaluation unit for estimating the difference between the received transmission signals and the ideal expected signal constellation in order to determine the weights for each constellation symbols and applying the determined weights for each symbolwise of the received transmission data, a HARQ combining unit for storing the weighted data as final data in a buffer and a processor to process the stored final data to determine whether the received data frames are correct.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the detailed description of the invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

Figure 1:
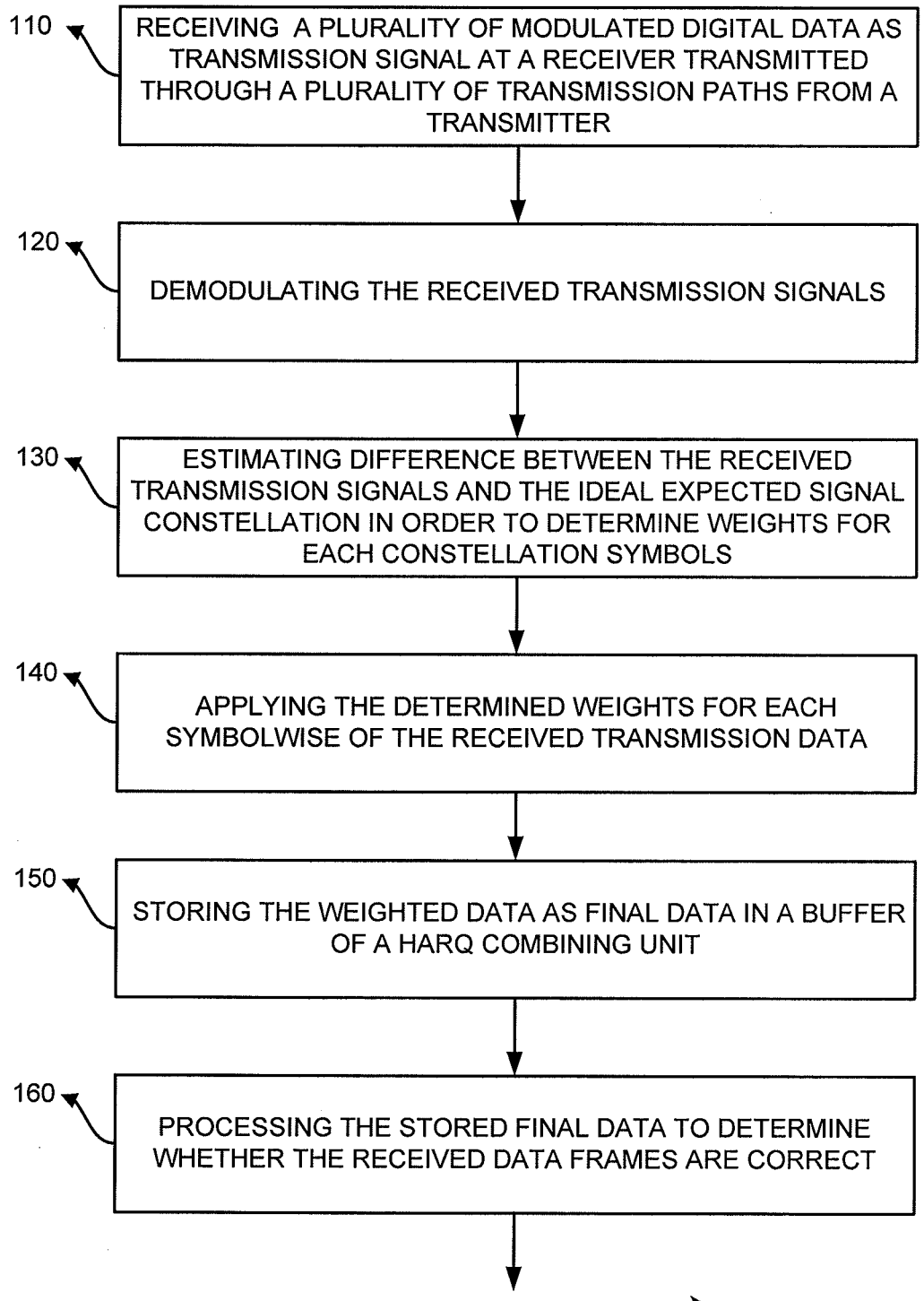
FIG. 1 shows a flow chart of a method for efficient error free packet reception using hybrid automatic repeat-request (HARQ) in a wireless communication system according to one embodiment of the present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

FIG. 1 shows a flow chart of a method for efficient error free packet reception using hybrid automatic repeat-request (HARQ) in a wireless communication system according to one embodiment of the present invention.

At step 110, the method receives one or more modulated digital data as transmission signal at a receiver transmitted through one or more of transmission paths from a transmitter.

At step 120, the method demodulates the received transmission signals using an OFDM demodulator unit.

At step 130, the method estimates difference between the received transmission signals and the ideal expected signal constellation in order to determine weights for each constellation symbols using an evaluation unit. The estimating the difference between the received transmission signals and the ideal expected signal constellation using the Euclidean distance method which takes care of frequency selective fading. Any other method may be used in order to estimate the difference. The symbols of the received signal vectors correspond to a signal constellation set, where the signal constellation set is based on Quadrature Phase Shift Key, Quadrature amplitude modulation etc.

At step 140, the method applies the determined weights for each symbolwise of the received transmission data. The weight calculation decides the combining efficiency using a HARQ combining unit.

At step 150, the method stores the weighted data as final data in a buffer of the HARQ combining unit.

At step 160, the method processes using a processor to stored the final data in order to determine whether the received data frames are correct.

If the received data are correct, the receiver outputs the final data and feeding back an ACK indicator respectively to the HARQ combining unit of the receiver and the transmitter. If the data are not correct, the receivers feeding back a NACK indicator respectively to the HARQ combining unit of the receiver and the transmitter. The HARQ combining unit of the receiver and the transmitter receiving a NACK indicator, the transmitter retransmitting original data to the receiver, then the HARQ combining unit of the receiver weighting the received retransmission data, and combining the weighted retransmission data with the data stored in the buffer of the HARQ combining unit, and at the same time, storing the combined data as final data in the buffer of the HARQ combining unit, then the receiver processing the combined final data to determine whether the combined data frames are correct. The processing of stored final data including soft decoding and CRC checking in turn, and then obtaining an ACK or NACK indicator based on the determination whether the received data is correct by CRC checking.

In an example embodiment, the packet received over air interface is usually corrupted because of channel impairments. The corrupted packet received at the receiver is subjected to channel estimation and equalization to overcome the channel impairments. Based on the channel estimation and equalization algorithm selected at the receiver, channel impairment effects are minimized. Received packet is demodulated and subjected to HARQ combining followed by FEC Decoder. The receiver processing as explained below.

Every 1 ms 30720 samples are received over CPRI interface are stored in buffer. From the buffered samples, OFDM symbols are extracted leaving out cyclic prefix samples. The OFDM symbols are subjected to channel estimation and equalization. Partially connected symbols are demodulated to obtain the soft bits and Error Vector Magnitude (EVM) are stored in to buffer. Scrambling bits are applied on soft bits to obtain the descrambled soft bits. The descrambled soft bits are weighted as defined in combining step as explained below. The weighted soft bits are added and fed to turbo decoder. Correctness of turbo decoder output is verified with a CRC check. The weighted HARQ combining based on Euclidean distance estimates. The process is split into 3 steps.
(1) Error Vector magnitude (EVM) Calculation
(2) Weight (Wn) calculation based on EVM
(3) Application of weight for combining
EVM Calculation EVM calculation between points ($I_{ideal}, Q_{ideal}$) and (I, Q) is given in below equation.

$$EVM = \sqrt{(I - I_{ideal})^2 - (Q - Q_{ideal})^2}$$

Where I and Q represents In-phase and Quadrature phase components of the constellation.
Weight (Wn) Calculation Based on EVM Weights are Calculation using following equations.

$$W_n = 1 - \frac{EVM_n}{EVM_{max}}$$

Where n is the nth symbol.
Application of Weight for Combining

Weights computed in the above are applied to the demodulated soft bits using following equation.

$$Y_n = W_n * X_n$$

Figure 4:
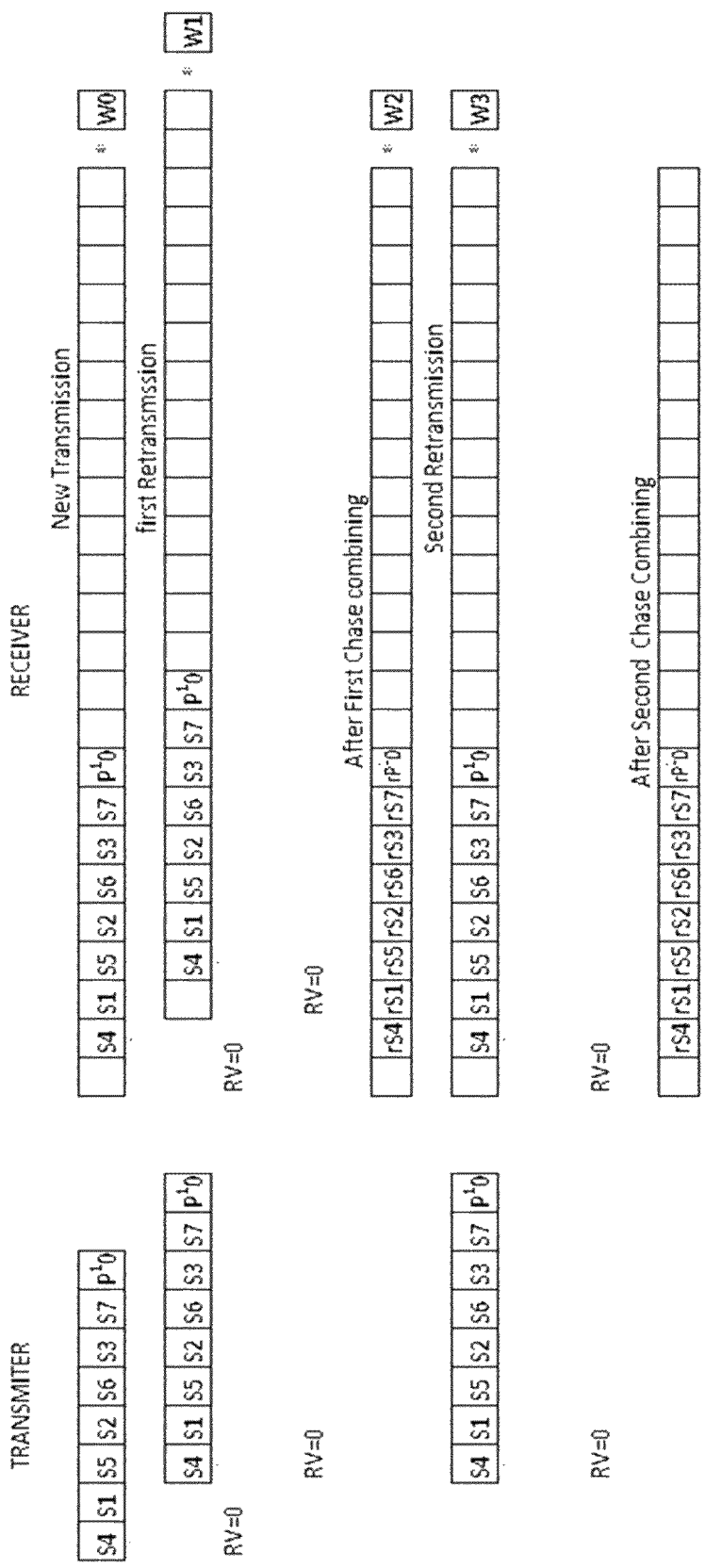
FIG. 4 illustrates the transmitted data with redundancy versions (RV=0), weights for each transmission and combined data with weights. Redundancy version is the code rate used for each transmission.

FIG. 4 shows the combining operation.

In an example embodiment, the transmitter transmits symbols S4S1S5S2S6S3S7P$^1$0. The receiver receives S4S1S5S2S6S3S7P$^1$0. The distance between the received symbol and ideal constellation symbol is calculated and noted as weights W0 for the initial transmitted symbols. If there is CRC error, the error will be notified to the transmitter and thereupon the transmitter will retransmit the same symbols. Upon receiving the symbols (which is shown as first retransmission in the figure) distance is calculated again for retransmitted symbols and retained as W1. Subsequently, the HARQ combining takes place and passed for CRC error check. If the CRC error occurs, then the combined data or resultant will be stored in the buffer which is shown as rS4rS1rS5rS2rS6rS3rS7rP$^1$0. This repeats till CRC check passes or maximum HARQ retry allowed by the system.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module (i.e., the code, instructions, etc.) may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction or code, or many instructions or strings/sets of code, and may be distributed over several different code segments or instruction sets, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules or steps or unit or other appropriate means for performing the methods and techniques described herein, such as those illustrated by FIG. 1 can be downloaded and/or otherwise obtained by a user terminal and/or base station as applicable. For example, such a device can be coupled to a server to facilitate the transfer of means for performing the methods described herein. Alternatively, various methods described herein can be provided via a storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

Figure 2:
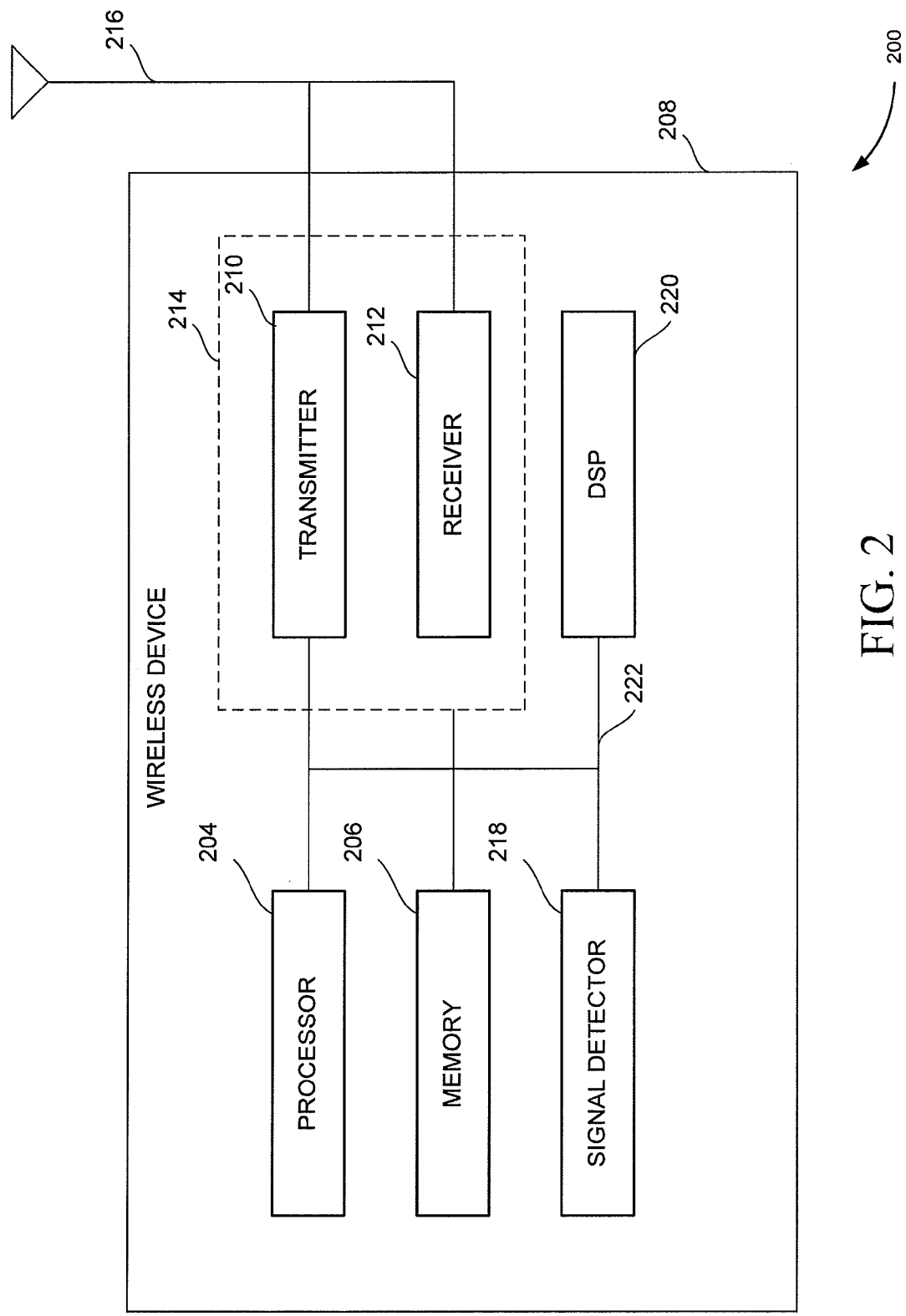
FIG. 2 illustrates various components that may be utilized in a wireless device in accordance with certain embodiments of the present disclosure.
Figure 3:
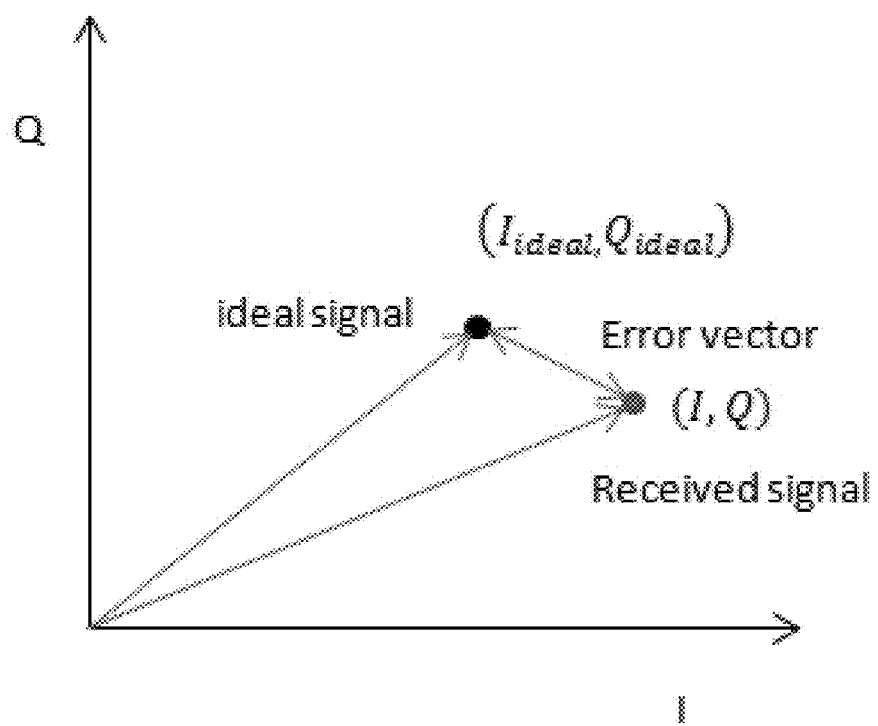
FIG. 3 illustrates an EVM Calculation between points ($I_{ideal}, Q_{ideal}$) and (I, Q).

FIG. 2 illustrates various components that may be utilized in a wireless device 200. The wireless device 200 is an example of a device that may be configured to implement the various methods described herein. The wireless device 202 may be a base station (e.g. Enode B) 104 or a user terminal 106.

The wireless device 200 may include a processor 204 which controls operation of the wireless device 200. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 200 may also include a housing 208 that may include a transmitter 210 and a receiver 212 to allow transmission and reception of data between the wireless device 200 and a remote location. The transmitter 210 and receiver 212 may be combined into a transceiver 214. An antenna 216 may be attached to the housing 208 and electrically coupled to the transceiver 214. The wireless device 200 may also include (not shown) multiple transmitters, multiple receivers, multiple transceivers, and/or multiple antennas.

The wireless device 200 may also include a signal detector 218 that may be used in an effort to detect and quantify the level of signals received by the transceiver 214. The signal detector 218 may detect such signals as total energy, pilot energy per pseudonoise (PN) chips, power spectral density, and other signals. The wireless device 200 may also include a digital signal processor (DSP) 220 for use in processing signals.

The various components of the wireless device 200 may be coupled together by a bus system 222, which may include a power bus, a control signal bus, and a status signal bus in addition to a data bus.

It is to be understood that the claims are not limited to the precise configuration and components illustrated above. Various modifications, changes and variations may be made in the arrangement, operation and details of the methods and apparatus described above without departing from the scope of the claims.

We claim:

1. A method for efficient error free packet reception using hybrid automatic repeat-request (HARQ) in a wireless communication system, the method comprising:
   receiving a plurality of modulated digital data as transmission signals at a receiver transmitted through a plurality of transmission paths from a transmitter, the received transmission signals having a signal constellation set comprising orthogonal frequency division multiplexing (OFDM) symbols;
   demodulating the received transmission signals, wherein demodulating the received transmission signals further comprises demodulating the OFDM symbols to determine soft bits and an error vector magnitude (EVM), wherein determining the EVM comprises determining a distance between the received transmission signals and an expected transmission signals, and wherein determining the distance comprises determining the distance from in-phase and quadrature phase components of the received transmission signals and the expected transmission signals;
   determining weights for each the OFDM symbols based on the determined EVM;
   applying the determined weights for each symbolwise of the received transmission data;
   storing the weighted data as final data in a buffer of a HARQ combining unit; and
   processing the stored final data to determine whether the received data frames are correct.

2. The method of claim 1, further comprising wherein if the received data are correct, the receiver outputting the final data and feeding back an acknowledgement (ACK) indicator respectively to the HARQ combining unit of the receiver and the transmitter, and if the data are not correct, the receiver feeding back a negative acknowledgement (NACK) indicator respectively to the HARQ combining unit of the receiver and the transmitter.

3. The method of claim 2, further comprising wherein the HARQ combining unit of the receiver and the transmitter receiving the NACK indicator, the transmitter retransmitting original data to the receiver, then the HARQ combining unit of the receiver weighting the received retransmission data, and combining the weighted retransmission data with the data stored in the buffer of the HARQ combining unit, and at the same time, storing the combined data as final data in the buffer of the HARQ combining unit, then the receiver processing the combined final data to determine whether the combined data frames are correct.

4. The method of claim 1, wherein processing stored final data comprises soft decoding and cyclic redundancy checking (CRC) checking in turn, and then obtaining an acknowledgement (ACK) or a negative acknowledgement (NACK) indicator based on the determination whether the received data is correct by the CRC checking.

5. The method of claim 1, wherein the signal constellation set is based on at least one of the following: Quadrature Phase Shift Key and Quadrature amplitude modulation.

6. The method of claim 1, wherein determining the distance comprises determining the distance using an Euclidean distance method.

7. An enode B, comprising:
   a receiver for receiving in a plurality of modulated digital data as transmission signals transmitted through a plurality of transmission paths from a transmitter, the received transmission signals having a signal constellation set comprising orthogonal frequency division multiplexing (OFDM) symbols;
   an OFDM demodulator unit for demodulating the received transmission signals;
   an evaluation unit for estimating the difference between the received transmission signals and the ideal expected signal constellation in order to determine the weights for each constellation symbols and applying the determined weights for each symbolwise of the received transmission data, wherein estimating the difference comprises determining an error vector magnitude (EVM), wherein determining the EVM comprises determining a distance between the received transmission signals and an expected transmission signals, wherein determining the distance comprises determining the distance from in-phase and quadrature phase components of the received transmission signals and the expected transmission signals, and wherein determining the weights comprises determining the weights based on the determined EVM;

a HARQ combining unit for storing the weighted data as final data in a buffer; and a processor to process the stored final data to determine whether the received data frames are correct.

8. The enodeB of claim 7, wherein the distance is determined by using Euclidean distance method.

* * * * *